United States Patent
Sfez et al.

(10) Patent No.: US 12,265,261 B2
(45) Date of Patent: Apr. 1, 2025

(54) OPTICAL FIBERS FUSION-SPLICING TO WAVEGUIDES

(71) Applicant: Soreq Nuclear Research Center, Yavne (IL)

(72) Inventors: Bruno Sfez, Yavne (IL); Neta Arad-Vosk, Yavne (IL); Netanel Malka, Yavne (IL)

(73) Assignee: Soreq Nuclear Research Center, Nahal Soreq (IL)

( * ) Notice: Subject to any disclaimer, the term of this patent is extended or adjusted under 35 U.S.C. 154(b) by 136 days.

(21) Appl. No.: 17/787,365

(22) PCT Filed: Dec. 20, 2020

(86) PCT No.: PCT/IB2020/062262
§ 371 (c)(1),
(2) Date: Jun. 20, 2022

(87) PCT Pub. No.: WO2021/124302
PCT Pub. Date: Jun. 24, 2021

(65) Prior Publication Data
US 2023/0019700 A1    Jan. 19, 2023

Related U.S. Application Data

(60) Provisional application No. 62/950,191, filed on Dec. 19, 2019.

(51) Int. Cl.
*G02B 6/255* (2006.01)
(52) U.S. Cl.
CPC .................................. *G02B 6/2551* (2013.01)

(58) Field of Classification Search
CPC ................................ G02B 6/2551; G02B 6/30
See application file for complete search history.

(56) References Cited

U.S. PATENT DOCUMENTS

| | | | |
|---|---|---|---|
| 6,411,759 B1 * | 6/2002 | Beguin | G02B 6/30 385/96 |
| 6,556,740 B1 * | 4/2003 | Hagelin | G02B 6/3512 385/18 |

(Continued)

FOREIGN PATENT DOCUMENTS

| | | |
|---|---|---|
| FR | 2661512 | 10/1991 |
| JP | H03160406 | 7/1991 |
| JP | 05134137 A * | 5/1993 |

(Continued)

OTHER PUBLICATIONS

PCT Search Report and Written Opinion PCT/IB2020/062262, May 3, 2021.

(Continued)

*Primary Examiner* — Omar R Rojas
(74) *Attorney, Agent, or Firm* — Dekel Patent Ltd.; David Klein

(57) ABSTRACT

An apparatus for fusion welding one or several parallel optical fibers (102) to the same number of waveguides (101) includes a fiber guiding device and a highly reflective surface (104) located below the fiber for each fiber-waveguide pair, and a laser beam (103) whose wavelength is chosen such that its light is strongly absorbed by the fiber material and its shape is properly adjusted.

12 Claims, 4 Drawing Sheets

(56) References Cited

U.S. PATENT DOCUMENTS 11,090,684 B2 *  8/2021  Shinoda ............... B05C 9/12
2002/0164132 A1   11/2002  Tian

FOREIGN PATENT DOCUMENTS

| JP | H05134137 | 5/1993 |
| JP | 07020346 A * | 1/1995 |
| JP | 2008286948 A * | 11/2008 |

OTHER PUBLICATIONS

Shimizu et al., "Fusion splicing between optical circuits and optical fibres", Electronic Letters, IEEE, vol. 19, Issue 3, Feb. 3, 1983, p. 96-97.

* cited by examiner

IRRADIANCE (W/mm2)

IRRADIANCE Y-CROSS SECTION SURFACE 9 FIBER FACET

IRRADIANCE (W/mm2)

IRRADIANCE Y-CROSS SECTION SURFACE 9 FIBER FACET

OPTICAL FIBERS FUSION-SPLICING TO WAVEGUIDES

FIELD OF THE INVENTION

The present invention relates generally to an apparatus and a method for fusion-splicing fibers to waveguides.

BACKGROUND OF THE INVENTION

There is an increasing need for a method for attaching fibers and fiber bundles to waveguides (die-attach) that does not use polymeric adhesives, that provides built-in active alignment and that is fast. Standard attachment using specific adhesive is not good enough because adhesives, being organic materials, have a relatively low glass transition temperature and are therefore susceptible to degrade the waveguide-fiber alignment with time. Fusion-splicing methods that use an electric arc or $CO_2$ laser as a source of heat produce better performance. However, some materials are damaged by the heating process (e.g., soft glasses). Moreover, the waveguide itself may be modified and even erased by the heat. Therefore, a controlled fusion-splicing process is required, where the heating is local, and the temperature can be controlled to reach only the minimum value required for splicing without inducing any damage.

SUMMARY

The present invention aims to solve this problem by splicing the fiber to the waveguide so as to realize an optimal attachment process. In order to do so, a laser beam illuminates one fiber (or several parallel fibers) in a small region of this fiber; the light is absorbed, generating heat within the fiber. Heat propagates toward the distal end of the fiber so that the fiber facet is heated at a sufficiently high temperature. When the required temperature is reached, the fiber is brought towards the waveguide facet and heats it. The temperature of the waveguide substrate can be controlled by choosing the appropriate laser power, its distance from the waveguide, the number of laser pulses and their duration. According to the respective softening point of the fiber and the waveguide substrate, only the waveguide softens or both the waveguide and the fiber soften, so that by pressing one against the other, splicing is obtained. One aspect of the process is to heat the fiber as homogenously as possible. In order to do so, optical reflectors located on the side opposite to the fiber heating spot concentrate the laser light towards the shadowed side of the fiber so that the fiber is heated all over its perimeter, thereby keeping as best as possible the circular symmetry of the fiber. This results in a much better fusion process, where only one laser is used, simplifying alignment and repeatability. The optical reflectors can be part of the die or external to it.

Furthermore, using several reflectors, multiple fibers can be spliced simultaneously.

There is provided in accordance with a non-limiting embodiment of the invention a method for attaching an optical fiber to an optical waveguide including positioning a distal end of at least one optical fiber in spaced-apart alignment with a facet of at least one optical waveguide, illuminating and heating the distal end of at least one optical fiber with a laser beam, heating the facet of the at least one optical waveguide, wherein the facet reaches its softening point temperature, and pressing the distal end of the at least one optical fiber against the facet of the at least one optical waveguide until the at least one optical fiber is welded to the at least one optical waveguide.

In accordance with a non-limiting embodiment of the invention the distal end of the at least one optical fiber is heated to its softening point temperature.

In accordance with a non-limiting embodiment of the invention the softening point temperature of the facet of the at least one optical waveguide is lower than the softening point temperature of the at least one optical fiber.

In accordance with a non-limiting embodiment of the invention heating the facet of the at least one optical waveguide includes bringing the distal end of the at least one optical fiber, after having been heated, close to the facet of at least one optical waveguide so that the distal end heats the facet to the softening point temperature.

In accordance with a non-limiting embodiment of the invention heating the distal end of the at least one optical fiber includes placing a reflector on a side of the at least one optical fiber opposite to the laser beam, so that a perimeter of the at least one optical fiber is heated by the laser beam.

In accordance with a non-limiting embodiment of the invention a distance between the at least one optical fiber and the reflector is of an order of half a Rayleigh range of the laser beam.

In accordance with a non-limiting embodiment of the invention a profile of the laser beam is asymmetric, wherein in a direction parallel to the at least one optical fiber the profile is a Gaussian profile and wherein in direction perpendicular to the at least one optical fiber the profile is a flat top profile.

In accordance with a non-limiting embodiment of the invention the reflector includes two flat reflective surfaces that are symmetrical regarding to a plane that crosses a longitudinal axis of the at least one optical fiber and perpendicular to the facet. In accordance with a non-limiting embodiment of the invention the reflector includes two circular reflective surfaces that are symmetrical regarding to a plane that crosses a longitudinal axis of the at least one optical fiber and perpendicular to the facet.

DETAILED DESCRIPTION

A critical issue in optical fiber technology is the connection of the fibers to planar optical waveguides. This is a recurrent problem since optical fibers are essentially used for information transmission while information processing is usually performed on a planar geometry. Such a problem is particularly important in the field of silicon photonics, fiber communication, RF over fiber, fiber sensing and many more other applications.

In most cases several of the following issues must be solved simultaneously:

1. The fiber-waveguide bonding must be spliced

This is due to the fact that adhesive bonding degrades in time, and modifies the coupling efficiency between the fiber and the waveguide.

2. The fiber softening point is higher than the waveguide softening point

The fiber is usually made of fused silicate glass, with a glass melting temperature typically in the 1500° C. to 2000° C. range. Waveguide substrates are usually made of softer materials such as silicon, lithium niobate, III-V compounds, lower melting temperature glasses (such as BK7), soft glasses (such as fluoride glasses), etc. Therefore, splicing using standard techniques may lead to waveguide deterioration.

3. Several fibers must be bonded simultaneously

In many cases, a bundle of fibers must be bonded to an array of waveguides. Bonding them one by one is not only a lengthy process but might also reduce the yield since the fibers must be individually manipulated.

4. The fibers must be actively aligned to the waveguides

The alignment precision is typically below 0.5 microns for telecommunication wavelengths. Prior art active alignment uses an external signal feedback that must be optimized, requiring expensive equipment.

These issues make the connection of fibers to waveguides a challenge that has to be repetitively solved.

The present invention solves simultaneously all these problems by using a laser based approach that is simple to implement as is now explained.

DESCRIPTION OF THE APPARATUS

Figure 1:
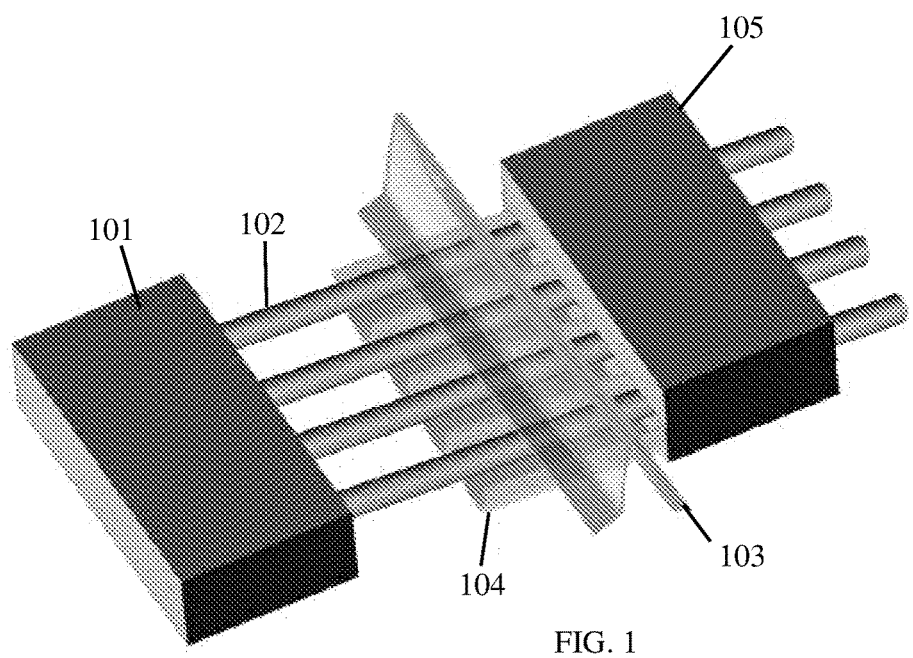
FIG. 1 shows a 3-dimensional view of the apparatus. An optical waveguide 101 has a planar facet parallel to the facet of an optical fiber 102 or facets of optical fibers 102. A laser beam 103 impinges on the optical fibers 102 and is partly reflected on a special reflector 104. Laser beam 103 is depicted in the figure by the intensity profile of the laser beam that impinges in the fibers. Locking apparatus 105 is a mechanical apparatus that maintains fibers locked in a precise position.

In FIG. 1, planar waveguides 101 are embedded within a material. A fiber or fibers 102 must be bonded to the waveguides 101 embedded in the material. An external laser beam 103 impinges on the fibers 102 at some position from the distal end of the fibers 102, this position being a free parameter that can be tuned according to the structure and materials of the waveguides 101. A laser beam 103 is represented by its intensity profile at the location where it impinges on the fibers. This profile is asymmetric: in the direction parallel to the fibers 102 it has a Gaussian profile whereas in the direction perpendicular to the fibers 102 it has a flat intensity (flat top profile). The fibers material and the laser are chosen in such a way that the laser light is absorbed by the fibers 102. For example, but without limitation, $CO_2$ laser is particularly suited for silicate fibers processing.

For sake of simplicity, we now consider a single fiber-waveguide process.

As mentioned before, in the plane containing the fiber (parallel to the fibers), the laser intensity profile is Gaussian.

Figure 2:
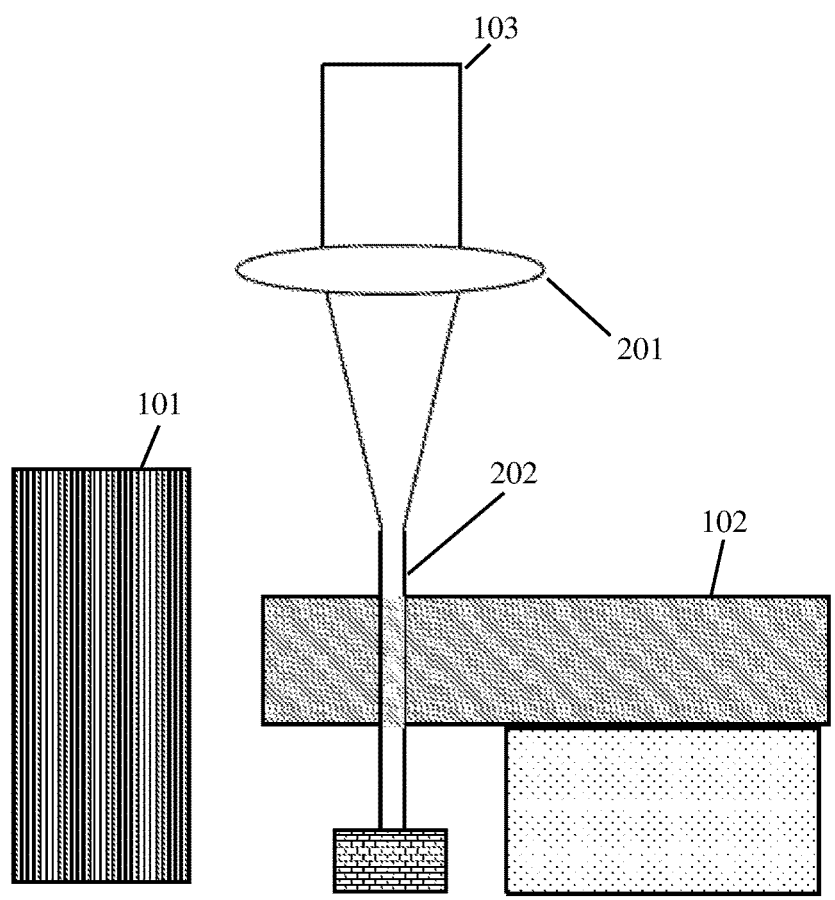
FIG. 2 shows the apparatus in a planar section that contains both the fiber and the laser beam. In this view, the laser beam is focused using a cylindrical lens 201 so that the beam is focused on the reflector, and the fiber is within the laser beam Rayleigh range 202.

In FIG. 2, another view is provided in order to better describe the beam shape in the plane containing the fiber. The beam 103 is focused on the fiber using a cylindrical lens 201. The focusing properties of the optical configuration are such that the distance between the fiber 102 and the mirrors 104 is of the order of half the Rayleigh range of the laser.

Figure 3:
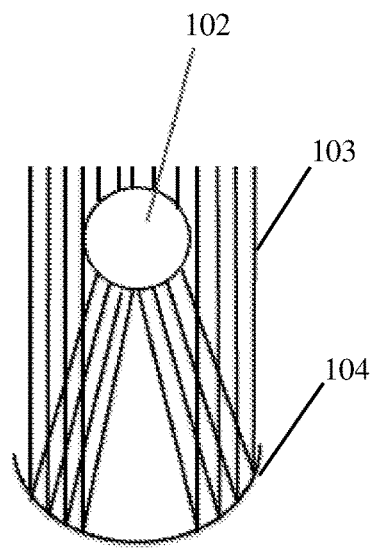
FIG. 3 shows the apparatus in a planar section that is parallel to the fiber facet 102 and contains the laser beam 103. In that plane the beam is approximately parallel and impinges on the optical fiber so that a portion of it is stopped and absorbed by the fiber and a portion of it goes on and impinges on the reflector 104. The beam portion that impinges on the reflector is reflected back to the fiber so that the illumination on the fiber is as homogeneous as possible. The fiber is therefore heated relatively homogeneously along its perimeter.

As mentioned before, in the plane perpendicular to the fiber, the laser intensity profile is flat top. The effect is best viewed in FIG. 3. In the direction that is perpendicular to the fiber, the laser beam 103 is larger than the fiber diameter so that part of it impinges on the fiber and is absorbed, therefore generating heat.

Laser light that does not impinge on the fiber continues its way until it impinges on mirror 104 that is especially shaped so that it reflects and focuses the laser light towards the shadowed part of the fiber 102 in such a way that the fiber is illuminated as uniformly as possible by the laser beam, which generates uniform heat.

Figure 4:
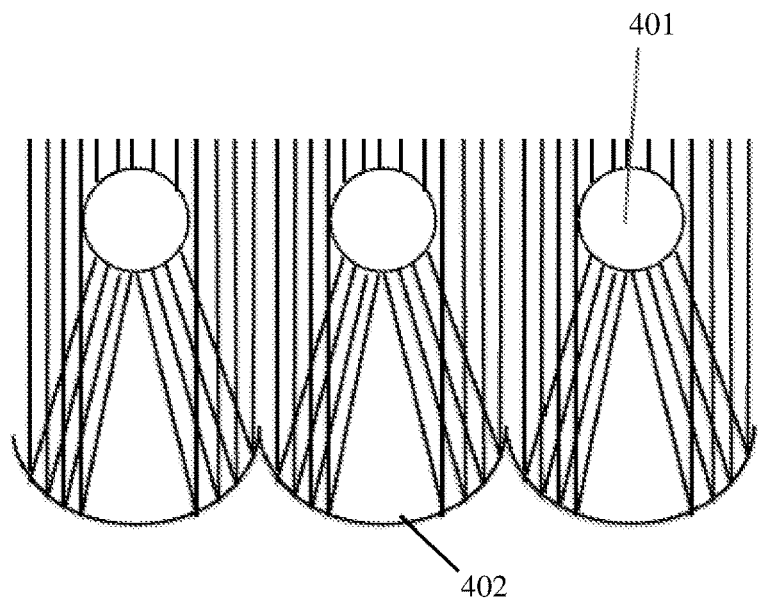
FIG. 4 shows an array of such fibers 401 and an array of such reflectors 402 that are evenly spaced and are positioned correspondingly, as well as the effect of a laser beam impinging on an array of these elements. Provided that the laser beam is homogenously distributed (flat top) along the direction perpendicular to the fibers, all the fibers receive an equal thermal treatment and can be sliced in parallel.

In FIG. 4, an assembly of several identical fibers and mirror assemblies is displayed. The laser beam impinges on all the fibers simultaneously. It is uniform (flat top) in the direction perpendicular to the fibers, and Gaussian in the direction parallel to the fibers. For each fiber the process described above applies.

Description of the Method

Figure 5:
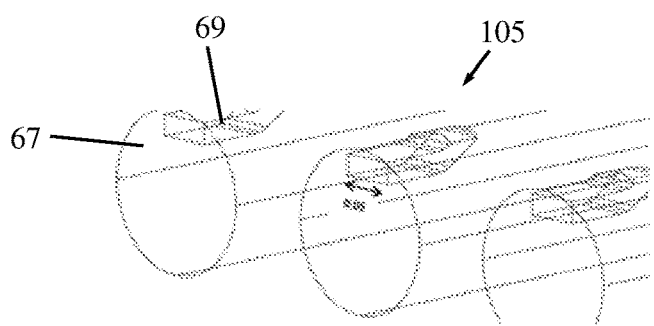
FIG. 5 shows the internal structure of the tunnels in which the fibers are inserted. The tunnels diameter is slightly larger than the fibers diameter and a spring within the tunnels ensures that the fibers are locked in place.

In reference to FIG. 1, the fibers are first introduced into the locking apparatus 105. This apparatus is made of a series of parallel tunnels 67 large enough so that the fibers can be introduced within them. The tunnels cross-section can be circular, elliptic or include a V-groove profile. In one embodiment, each tunnel 67 contains a biasing device 69 (any suitable spring force element) internal to the tunnel 67 that allows the fiber to be introduced within the tunnel but presses on the fiber, once it is introduced within the tunnel, as shown for example in FIG. 5. This spring locks the fiber in its position.

The remaining part of the method is illustrated in FIGS. 6A-6G.

Figures 6A, 6B, 6C, 6D, 6E, 6F, 6G:
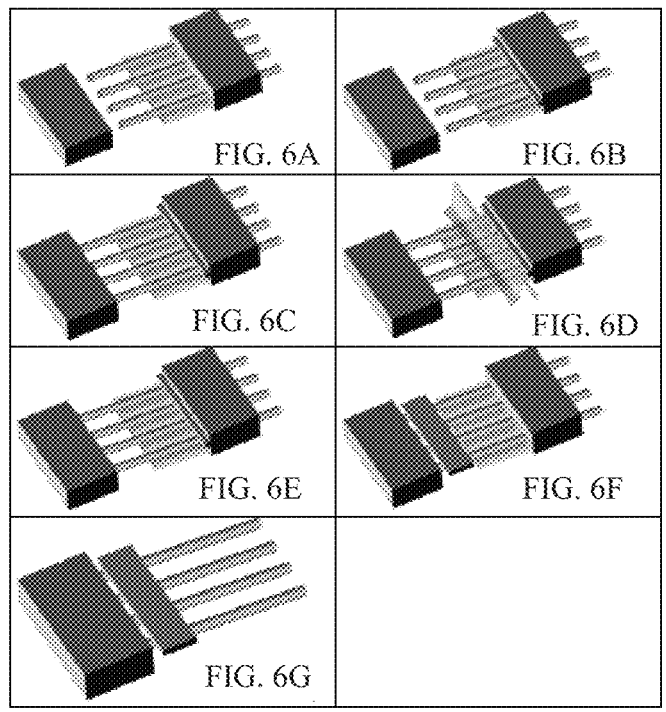
FIGS. 6A-6G shows the procedure for the fibers fusion process. The details are explained below.

Once all the fibers are introduced within the apparatus, the assembly is pressed against an adequately flat surface so that the fibers facets plane is located between the waveguide facets plane and the reflector ends plane (FIG. 6A). Then an adhesive is put on the fibers so that the fibers are locked in place for the rest of the procedure (FIG. 6B). The fiber array assembly is then aligned against the waveguide array and pressed against it (FIG. 6C). The laser is then turned on for the adequate duration (FIG. 6D) while pressing. The laser is then turned off (FIG. 6E), leaving the fibers welded to the waveguides.

If one is interested in removing the fibers assembly jig, an adhesive (such as epoxy) is adequately deposited on the fibers in order to maintain them mechanically and the adhesive deposited earlier (FIG. 6F) is removed. The fibers assembly jig can be then removed mechanically without harming the fiber assembly (FIG. 6G).

EXAMPLES

Here are several examples of such an assembly.

Figure 7:
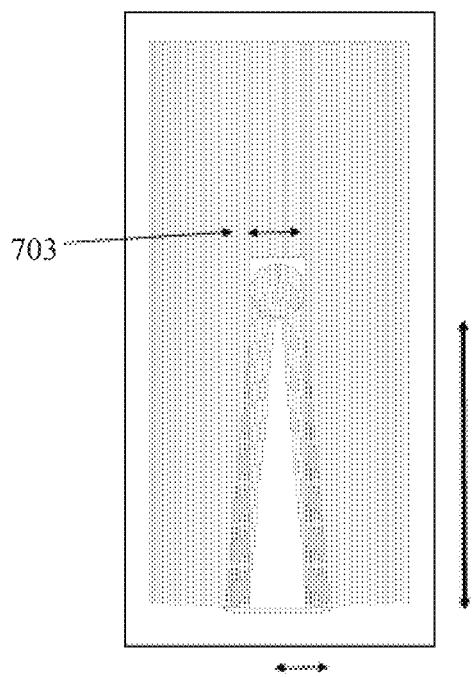
FIG. 7 shows configuration with flat mirrors.

Reference is now made to FIG. 7. The fibers are silica fibers, with a diameter of 703 of 125 microns (after the jacket is removed) and a pitch of 250 microns between the fibers. The laser is a $CO_2$ laser emitting at 10.6 μm wavelength. It is best to use two symmetrical reflectors for each fiber.

Example 1: Flat Reflectors

Using flat reflectors, the optimal distance between the fiber and the reflectors is 680 microns, the flat mirror length is 250 microns (the pitch), and the reflectors are tilted at an angle of 2.4 degrees from the horizontal plane.

Figure 8:
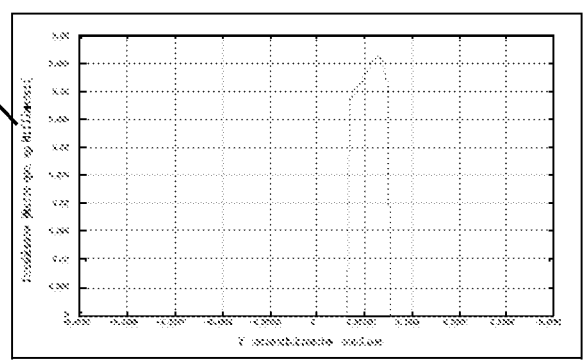
FIG. 8 shows the illumination distribution on the shadowed part of the fiber with flat mirrors (half the distribution).

The simulated irradiance is shown in FIG. 8 (taking into account the light diffraction at the fiber and at the reflectors). About 90% of the light is reflected back to the shadowed part of the fiber.

Example 2: Cylindrical Reflectors

Figure 9:
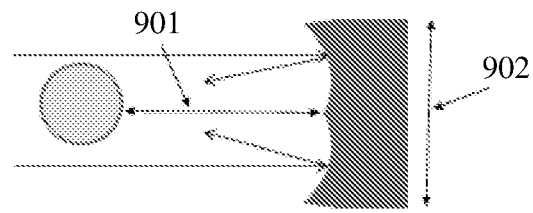
FIG. 9 shows the configuration with cylindrical mirrors.

Using cylindrical reflectors (FIG. 9), in optimal conditions, the distance between the fiber and the reflectors 901 is 680 microns, the cylindrical mirror length 902 is 250 microns (the pitch), their radius of curvature is 10 mm, and the reflectors are tilted at an angle of 2 degrees from the horizontal plane.

Figure 10:
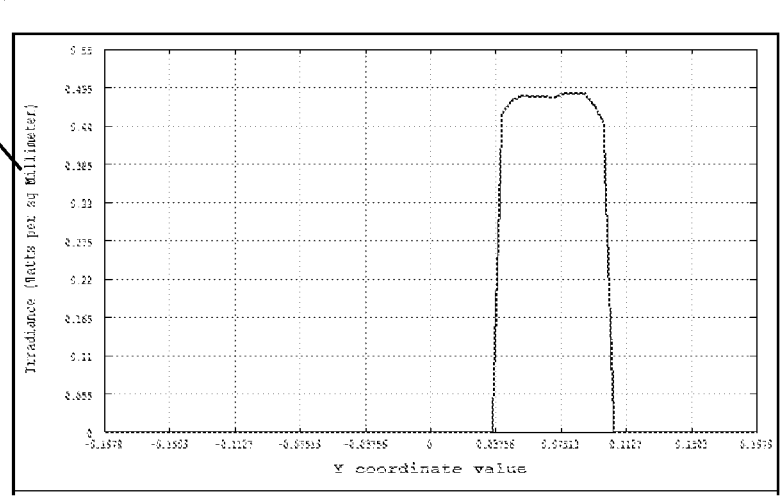
FIG. 10 shows the illumination distribution on the shadowed part of the fiber with cylindrical mirrors (half the distribution).

The simulated irradiance is shown in FIG. 10 (taking into account the light diffraction at the fiber and at the reflectors). Almost 99% of the light is reflected back on the shadowed part of the fiber, which is better than for the flat mirror.

The invention claimed is:

1. A method for attaching an optical fiber to an optical waveguide comprising:
    positioning a distal end of at least one optical fiber in spaced-apart alignment with a facet of at least one optical waveguide, there being a gap between said distal end and said facet;
    illuminating and heating said distal end of at least one optical fiber with a laser beam;
    heating said facet of said at least one optical waveguide, wherein said facet reaches its softening point temperature; and
    pressing said distal end of said at least one optical fiber against said facet of said at least one optical waveguide until said at least one optical fiber is welded to said at least one optical waveguide,
    wherein heating said distal end of said at least one optical fiber comprises placing more than one reflector on a side of said at least one optical fiber opposite to said laser beam, so that an entire perimeter of said at least one optical fiber is heated by said laser beam, the entire perimeter comprising first and second portions, wherein the first portion is heated by direct impingement from said laser beam and the second portion is heated by reflection of said laser beam from said reflectors, and wherein said reflectors are placed symmetrically on opposite sides of a diameter of said at least one optical fiber and said reflectors are tilted towards each other.

2. The method according to claim 1, wherein said distal end of said at least one optical fiber is heated to its softening point temperature.

3. The method according to claim 1, wherein the softening point temperature of said facet of said at least one optical waveguide is lower than the softening point temperature of said at least one optical fiber.

4. The method according to claim 1, wherein heating said facet of said at least one optical waveguide comprises bringing said distal end of said at least one optical fiber, after having been heated, close to said facet of at least one optical waveguide so that said distal end heats said facet to the softening point temperature.

5. The method according to claim 1, wherein a distance between said at least one optical fiber and said reflectors is of an order of half a Rayleigh range of said laser beam.

6. The method according to claim 1, wherein a profile of said laser beam is asymmetric, wherein in a direction parallel to said at least one optical fiber said profile is a Gaussian profile and wherein in direction perpendicular to said at least one optical fiber said profile is a flat top profile.

7. The method according to claim 1, wherein each of said reflectors comprises flat reflective surfaces.

8. The method according to claim 1, wherein each of said reflectors comprises curved reflective surfaces.

9. The method according to claim 1, wherein said reflectors are tilted at an angle of 2 degrees towards each other.

10. The method according to claim 1, wherein said reflectors are tilted at an angle of 2.4 degrees towards each other.

11. The method according to claim 1, wherein said reflectors are placed on opposite sides of a longitudinal centerline of a bottom surface of said at least one optical fiber and said reflectors are tilted towards said longitudinal centerline of the bottom surface.

12. The method according to claim 1, wherein outer edges of said reflectors abut against each other.

* * * * *